United States Patent [19]

Dapper

[11] Patent Number: 4,748,641
[45] Date of Patent: May 31, 1988

[54] SUPPRESSED CARRIER MODULATION METHOD
[75] Inventor: Mark J. Dapper, Cincinnati, Ohio
[73] Assignee: Cincinnati Electronics Corporation, Cincinnati, Ohio
[21] Appl. No.: 751,584
[22] Filed: Jul. 3, 1985
[51] Int. Cl.[4] .................................... H04L 27/20
[52] U.S. Cl. ................................. 375/67; 375/77; 329/110
[58] Field of Search ............. 375/39, 50, 57, 60, 375/67, 77; 370/20; 329/110; 332/16 R

[56] References Cited
U.S. PATENT DOCUMENTS

| 3,925,611 | 12/1975 | Dennis | 375/39 |
| 4,024,342 | 5/1977 | Croisier et al. | 375/39 |
| 4,055,727 | 10/1977 | Katoh | 375/57 |
| 4,100,369 | 7/1978 | Stenstrom et al. | 375/57 |
| 4,404,532 | 9/1983 | Welti | 375/67 |
| 4,489,418 | 12/1984 | Mazo | 375/39 |
| 4,567,602 | 1/1986 | Kato et al. | 375/60 |

Primary Examiner—Robert L. Griffin
Assistant Examiner—Stephen Chin
Attorney, Agent, or Firm—Lowe, Price, LeBlanc, Becker & Shur

[57] ABSTRACT

A carrier is modulated with binary coded data to produce a suppressed carrier constant amplitude wave by shaping modulation for the carrier so the carrier phase changes gradually between predetermined values without cumulative errors, in response to adjacent bits having different values.

32 Claims, 2 Drawing Sheets

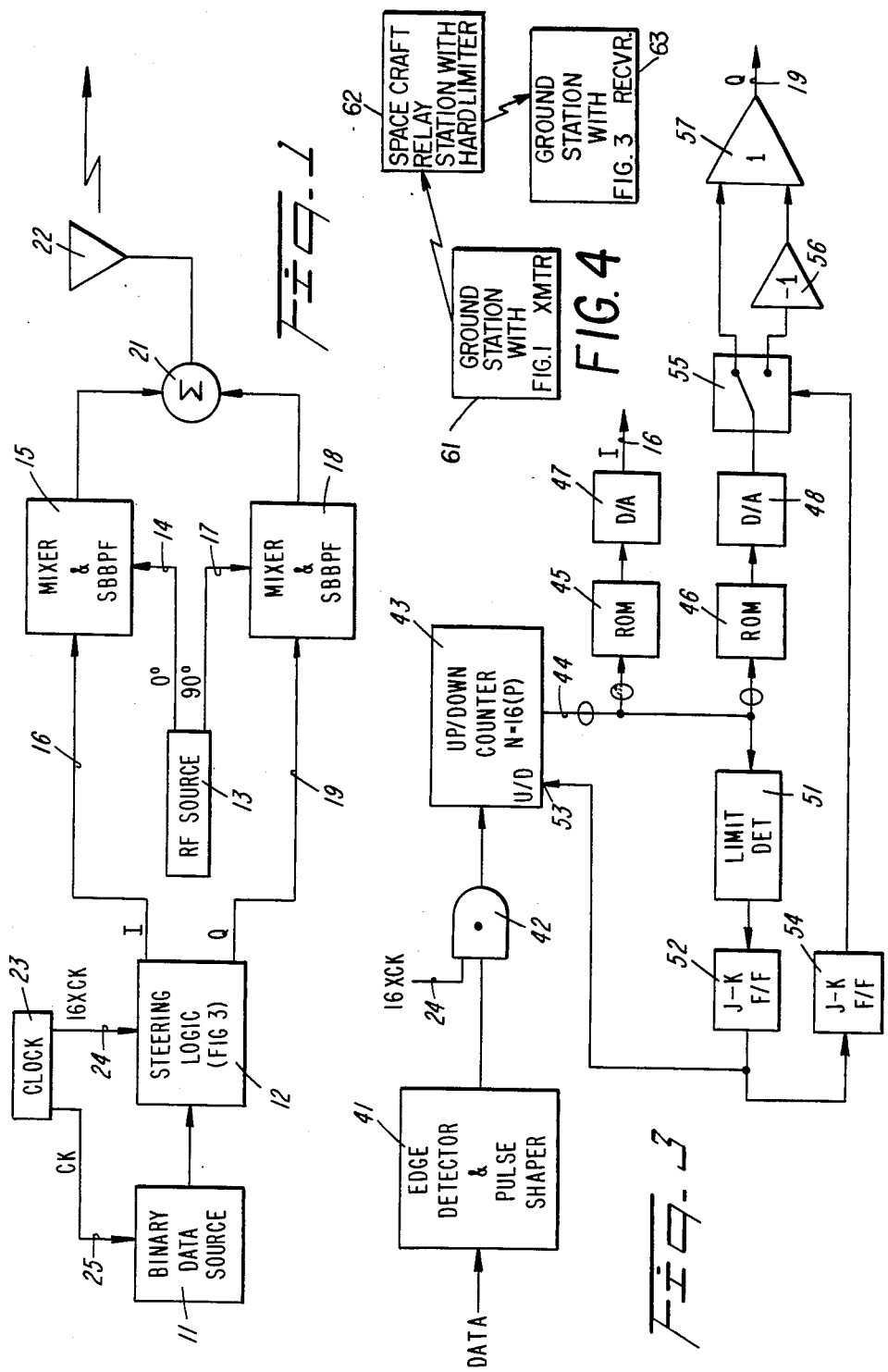

SUPPRESSED CARRIER MODULATION METHOD

FIELD OF INVENTION

The present invention relates generally to binary modulating and transmitting methods and more particularly to a method of modulating a carrier by shaping carrier modulation so the carrier phase changes gradually between predetermined values without cumulative phase errors in response to adjacent bits having different values.

BACKGROUND ART

As technology has advanced to reduce the size of hardware, make it less expensive and more versatile, the number of communication terminals, particularly satellite terminals, has increased much faster than the available band width, particularly for satellite communications. As a result, it is imperative for available communication channels to be used as efficiently as possible, i.e., to have minimum band width. Minimum band width can be achieved by using spectrally efficient waveforms in the communication channel.

Improved spectral efficiency is always attained by increasing the modulation order, i.e., number of bits per symbol. However, the majority of communication channels presently in use employ hard-limiting transponders, to eliminate effectively schemes using amplitude modulation. While phase and frequency modulation techniques remain as viable alternatives, implementation considerations make orders higher than quarternary impractical, particularly for portable earth-bound equipment. While some of the quarternary approaches have excellent performance, implementation thereof is considerably more complex and expensive than binary schemes. In addition, the quarternary approaches are usually not compatible with the large number of binary phase shift key receivers presently available.

To reduce the band width of a channel, it is important for interference from adjacent channels to be minimized. Interference between adjacent channels can be injected in transmitting and receiving a signal, e.g., on both an uplink and a downlink in a satellite communication signal. It is therefore important to provide a signal having a power spectral density that is well contained in the band width of interest at both the transmitter, receiver and at a relay station, such as a satellite. For binary phase shift key like waveforms, this requirement eliminates any post-modulation filtering as a viable approach to achieving satisfactory spectral containment. Such post-modulation filtering imparts an amplitude modulation component on the original binary phase shift key waveform, such that the magnitude of the amplitude modulation component generally increases as the filter band width decreases. Hard limiters generally employed in repeaters, however, remove the AM component, and in the process restore spectral sidebands to virtually the same level as subsisted before filtering. The net effect of employing post-modulation filtering on a conventional, prior art binary phase shift key signal causes the signal derived from the repeater or by the receiver to be very nearly the same as binary phase shift key. The result of this post-modulation filtering is that the transmitted signal should have no amplitude modulation component, to prevent the limiter from producing unwanted spectral sidebands.

It is also important for detection efficiency to be at the same level as that of existing systems. If adjacent channel interference is reduced by use of improved spectral containment at the expense of detection efficiency the reduced channel interference would be for naught. It is also highly desirable for existing binary phase shift key receivers to be compatible with any new generation of transmitting methods which reduce adjacent channel interference and enable detection efficiency to be maintained.

It is, accordingly, an object of the present invention to provide a new and improved method of modulating a carrier and transmitting a suppressed carrier constant amplitude wave.

A further object of the invention is to provide a new and improved low band width method of modulating a carrier with binary coded data wherein the data are primarily contained in a narrow band width, to minimize interference between adjacent channels.

Another object of the invention is to provide a new and improved binary transmitting and modulating method that provides high detection efficiency, commensurate with existing systems, is compatible with existing binary phase shift key receiver equipment, and has high spectral containment in transmission, relaying and reception.

SUMMARY OF THE INVENTION

In accordance with one aspect of the present invention, a carrier is modulated by binary coded data to produce a suppressed carrier constant amplitude wave by shaping modulation for the carrier so the carrier phase changes gradually between predetermined values without cumulative errors in response to adjacent bits having different values. In other words, when a transition between adjacent bits occurs, the phase of the carrier changes gradually, rather than abruptly as has been the case with typical prior art suppressed carrier constant amplitude transmitting methods. Phase errors are not accumulated in response to the transitions because the transitions cause the carrier phase to change in opposite directions. To enable existing detectors to be utilized, the quadrature component of the modulation is shaped to have an average value of zero over four adjacent transitions of the binary bit values.

The modulation is shaped to cause (a) the phase change of the carrier to be zero relative to a reference phase for the carrier except when adjacent bits have different values, and (b) the phase of the carrier to rotate at a constant rate relative to the reference phase in response to adjacent bits having different values. In response to first, second, third and fourth successive transitions of binary bits, the modulation is shaped to cause the carrier phase to be rotated two times in the clockwise direction and two times in the counterclockwise direction. In response to the first and fourth transitions the phase is rotated in one of the directions, while in response to the second and third transitions, the phase is rotated in the other of the directions. This shaping method prevents the accumulation of phase errors. If the phase rotation occurs for between about 10% to about 50% of the length of a bit, no appreciable adjacent channel interference occurs, while enabling prior art detectors to be employed. If the phase rotation occurs for less than about 10% of a bit length, an appreciable improvement in spectral containment is not provided; if the phase is rotated for an excess of about 50% of a bit length, existing binary phase shift key detector equipment cannot generally be employed.

In a particular implementation of the invention, orthogonally phased first and second carrier components are derived. In response to the data, I and Q channel signals are derived and respectively mixed with the first and second channels to derive first and second sideband signals. The first and second sideband signals are linearly combined to derive the suppressed carrier constant amplitude wave. The I and Q channel signals are shaped so the phase of the suppressed carrier constant amplitude wave has the desired gradual change between predetermined values without cumulative phase errors. The I and Q channel signals are shaped so each has an average value of zero over four adjacent transitions of the binary bit values. Further, the I and Q channel signals are shaped so the phase change of the carrier is zero relative to a reference phase of the carrier except when adjacent bits have different values and the phase of the carrier rotates at a constant rate relative to the reference phase in response to adjacent bits having different values.

The Q and I channel signals are shaped in a novel manner to provide the desired gradual phase changes without cumulative phase errors. In particular, the Q channel signal is a first wave having a zero value except when adjacent binary bits have different values, in which case the first wave varies with the shape of a single hump having initial and final zero values and intermediate peak value. The I channel signal is a second wave having a non-zero predetermined value having positive and negative polarities, except when adjacent binary bits have different values, in which case the second wave varies between the positive and negative polarity values. In a sequence of four transitions of the binary data bits, the first wave has two positive humps and two negative humps, while the second wave has two changes from the positive to the negative polarity and two changes from the negative to the positive polarity. The two positive humps occur in response to successive first pairs of transitions of the binary data bits, while the two negative humps occur in response to successive second pairs of transitions of the binary data bits. The second transition of the first pair is immediately adjacent the first transition of the second pair. The humps begin and end substantially simultaneously with the beginning and end of the second wave variations. The humps of the first wave are shaped approximately as sine waves that vary from 0° to 180°, while the variations of the second wave are shaped approximately as cosine waves that vary from 0° to 180°.

In actual tests that have been conducted with the present invention, it has been found that it is possible to transmit successfully and accurately 2.4 kbps voice data on a 4 kHz channel, wherein the center frequencies of adjacent channels are spaced from each other by only 5 kHz. This is because the shaping technique of the present invention centers considerably more energy in the fundamental and first harmonic, and considerably less energy in the higher harmonics than prior suppressed carrier constant amplitude binary phase shift key modulating and transmitting methods.

The above and still further objects, features and advantages of the present invention will become apparent upon consideration of the following detailed description of a specific embodiment thereof, especially when taken in conjunction with the accompanying drawings.

BRIEF DESCRIPTION OF THE DRAWING

FIG. 1 is a block diagram of a binary phase shift key transmitter employing the invention;

FIG. 3 is a partial block, partial circuit diagram of apparatus included in the steering logic of FIG. 1; and FIG. 4 is a diagram of a transmission link including the invention.

DESCRIPTION OF THE PREFERRED EMBODIMENT

Figures 2A, 2B, 2C:
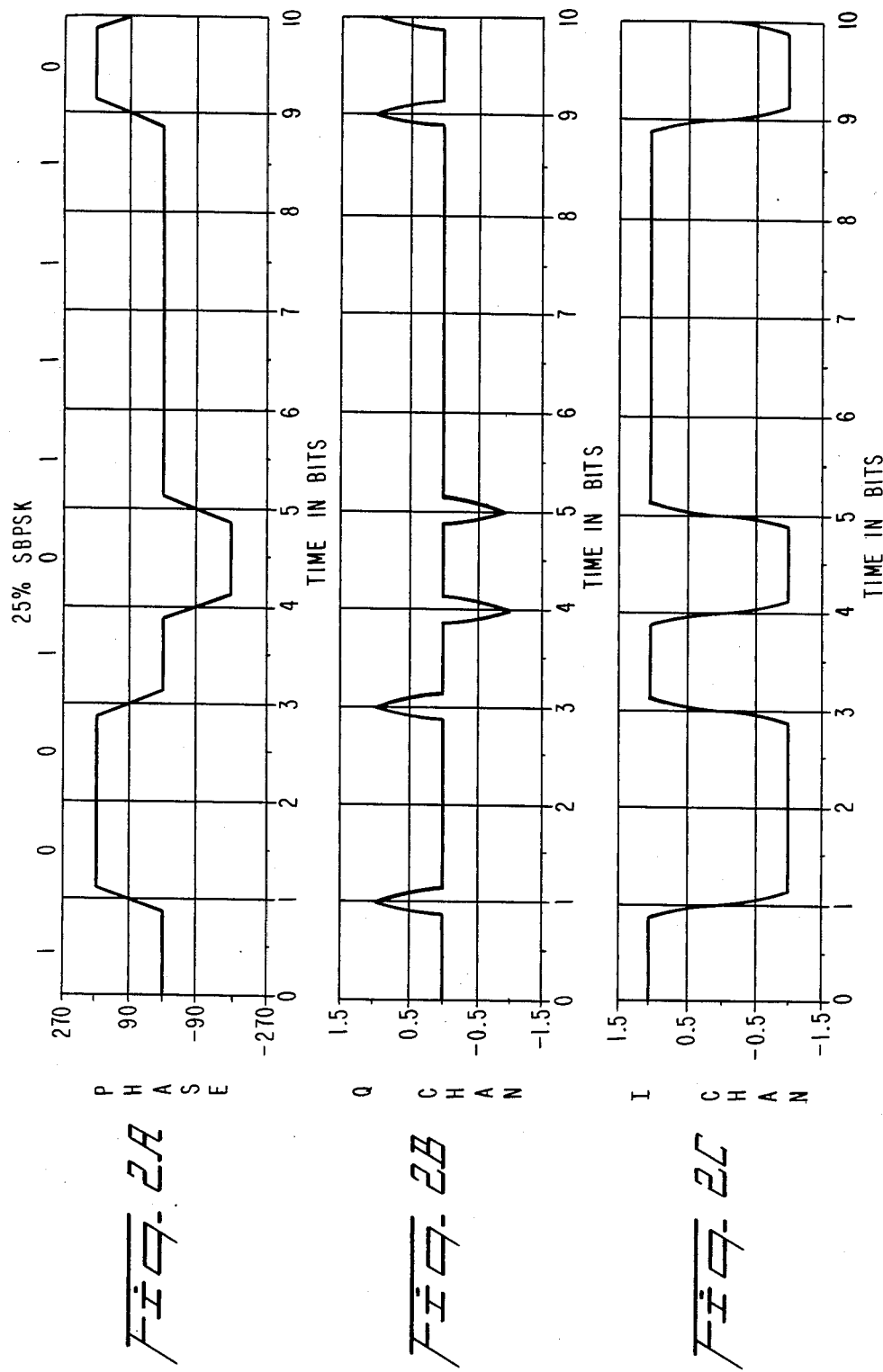
FIGS. 2A, 2B, and 2C are waveforms helpful in describing the method of operation of the invention.

Reference is now made to FIG. 1 of the drawing wherein binary data source 11, typically a digitized voice source, is applied to steering logic network 12 which derives I and Q channel signals which are combined with orthogonally phased outputs of RF source 13 to produce a suppressed carrier constant amplitude binary phase shift key wave. An output of RF source 13 having a zero or reference phase, as applied to lead 14, is applied to one input of mixer 15, having, a second input responsive to the I channel signal on lead 16. Source 13 derives, on lead 17, a wave having the same frequency, but 90° displaced, from the wave on lead 14. Mixer and sideband bandpass filter 18 has one input responsive to the signal on lead 17, and a second input responsive to the Q channel signal on lead 19. Mixers and sideband bandpass filters 15 and 18 pass the same sideband frequency resulting from amplitude modulating the outputs of wave shaping logic network 12 and RF source 13. Output signals of mixers and sideband bandpass filters 15 and 18 are linearly combined in summing network 21, which can include appropriate amplifiers and frequency translators. Summing network 21 derives a suppressed carrier constant amplitude wave, at the frequency of RF source 13, which drives antenna 22.

The operation of binary data source 11 and shaping logic network 12 are synchronized, by virtue of the data source and logic network both being responsive to synchronized output signals of clock source 23. In one preferred embodiment, the output of clock source 23 which is applied via lead 24 to shaping logic network 12 has a frequency 64 times that of the clock pulses applied by clock 23 to data source 11 on lead 25. It is to be understood, however, that the clock pulses on leads 24 and 25 can be related to each other by any suitable integral multiple, as long as the number of clock pulses applied to logic network 12 is sufficiently large during each binary data bit derived from source 11.

Shaping logic network 12 responds to the synchronized inputs thereof on lead 24 and from data source 11 to derive the I and Q channel signals on leads 16 and 19 which cause the suppressed carrier constant amplitude wave supplied by summing network 21 to antenna 22 to change gradually between predetermined values without cumulative phase errors in response to adjacent bits from the data source having different values. The shapes of the I and Q channel signals thus cause a fairly high percentage of the energy representing the binary data bits derived from source 11 to occupy a very narrow band width, sufficient to minimize interference between adjacent channels.

The shapes of the I and Q channel signals on leads 16 and 19 for an exemplary sequence of binary bits from source 11 are illustrated in FIGS. 2C and 2B, respectively. In FIG. 2A is illustrated the relative phase shift of the output of summing network 21 compared to the reference phase of RF source 13 on lead 14. The phase relationship illustrated in FIG. 2A results from the I and Q channel signals illustrated in FIGS. 2C and 2B, respectively.

For the purposes of FIGS. 2A, 2B and 2C, it is assumed that binary data source 11 derives a binary sequence represented by 1001011110 during ten successive time slots. Thus, transitions in the output of binary data source 11 occur at the end of the first, third, fourth, fifth, ninth and tenth time slots. As a result, there are no changes in the I and Q channel signals on leads 16 and 19 during the seventh and eighth time slots. During all other time slots there is at least one change in the value of the signals on leads 16 and 19, and in some of the time slots two changes occur. In the situation illustrated in FIG. 2, it is assumed that each transition in the binary value of the output of data source 11 causes a change at the end of one time slot and at the beginning of the adjacent time slot. Thus, each transition of source 11 causes a change at the end of time slot $t_1$ and a corresponding transition at the beginning of time slot ($t_1 + 1$) in each of the I and Q channel signals on leads 16 and 19. The transitions in the I and Q channel signals on leads 16 and 19 can occupy anywhere from 10% to 50% of a time slot, i.e., the time required for a binary bit that is coupled from source 11 to logic network 12 to occur. If the transition takes more than 50% of the time slot, conventional binary phase shift key circuitry cannot be used to detect the signal emitted from antenna 12. If the transition takes less than one-tenth of a time slot, there is not an appreciable improvement over the prior art binary phase shift key techniques. In the specific embodiment of FIG. 2, each transition occupies one quarter of a time slot.

The Q channel signal on lead 19 is shaped so that during the interval commensurate with the output of data source 11 when no transition occurs in the signal on lead 19, the signal on lead 19 has a zero value. In response to each transition in the output of binary data source 11, the Q channel signal on lead 19 deviates from the zero value, in the form of a hump having initial and final zero values and an intermediate peak value. Each hump has the same peak value, preferably formed as a sinusoidal function having an initial phase of 0°, a final phase of 180°, and a peak at 90°. Each of the sinusoidal humps in the waveform of FIG. 2B has a duration commensurate with 16 of the relatively high frequency clock pulses on lead 24 for the example illustrated in FIG. 2. If, however, each transition in the output of binary data source 11 were to require a phase change over 50% of the data bit, the duration of the sinusoidal humps in the Q channel would occupy 32 of the clock pulses on lead 24.

For any sequence of four successive transitions in the output of binary data source 11, there are two positive going sinusoidal humps, followed by two negative going humps. Thus, in the example considered in FIG. 2B, positive going humps occur in the vicinity of the ends of time slots 1 and 3, while negative going humps occur in the vicinity of the ends of time slots 4 and 5. In addition, a positive going transition occurs in the vicinity of the ends of time slots 9 and 10, based upon the assumption that there is a zero to one transition at the end of time slot 10.

Shaping logic network 12 responds to the output of binary data source 11 and the clock signal on lead 24 to produce the I channel signal illustrated in FIG. 2C, based upon the previous assumptions, concerning the binary bit sequence and the requirement for a gradual phase change to occupy 25% of the duration of each binary bit derived from data source 11. The shaped wave supplied by shaping logic network 12 to lead 16 includes two constant amplitude portions, each having the same predetermined value, but of opposite polarity. In response to binary data source 11 deriving a binary one value, the I channel signal on lead 16, as illustrated in FIG. 2C, has a positive predetermined value, except when a transition is occurring; in contrast, a binary zero value derived from data source 11 causes the I channel signal to have the negative predetermined value, except when it is undergoing a transition. In the vicinity of each transition, the I channel signal varies in accordance with an analytic function between the positive and negative values. The preferred shape of the analytic function is a cosine wave which varies from 0° to 180°, or is the complement of such a cosine wave. In the particul-arly illustrated embodiment, the waves have inverte-d cosine shapes in going from positive to negative values in the vicinities at the ends of time slots 1, 4 and 9; in the vicinity of the ends of time slots 3, 5 and 10, the I channel signal is shaped as a non-inverted cosine wave, in going from negative values to positive values.

The Q and I channel signals on leads 16 and 19, as illustrated in FIGS. 2B and 2C, are combined with the orthogonally related RF outputs of source 13 in the network including components 15, 18 and 21, to cause the output of summing network 21 to have phase deviations, as illustrated in FIG. 2A, relative to the phase of the reference RF wave on lead 14. The relative phase displacement between the output of summing network 21 and the signal on lead 14 is such that the two RF signals are in phase during 87.5% of the first bit, 75% of the fourth bit, 87.5% of the sixth bit, 100% of the seventh and eighth bits, 87.5% of the ninth bit, and 75% of the tenth bit. In the vicinity of the end of the first time slot, the phase at the output of summing network 21 increases relative to the phase of the signal on lead 14 by 180°. This phase change occurs gradually, in a linear manner over a period equal to one quarter of the duration of a bit derived from data source 11. The transition can be thought of as a constant rate phase rotation in the clockwise direction, resulting from the sinusoidal variation in the Q channel signal modulation on lead 19 and the inverse cosine modulation imposed on the RF source by the I channel signal on lead 16. After the transition in the vicinity of the end of the first time slot has been completed, the phase of the RF output of summing network 21 remains advanced 180° relative to the output of RF source 13 on lead 14, until just before the termination of the third time slot.

In the vicinity of the end of the third time slot, the I and Q channel signals on leads 16 and 19 modulate RF source 13 to cause the phase at the output of summing network 21 to decrease in a linear manner back to an in-phase relationship with the signal on lead 14. This condition subsists until the vicinity of the end of the fourth time slot, when the negative sinusoidal hump in the Q channel signal on lead 19 and the negative going cosine wave on the I channel lead 16 combine to modulate RF source 13 to change the phase of the output of summing network 21 so that it lags the signal on lead 14 by 180°. The transitions in the vicinity of the ends of time slots 3 and 4 of the phase changes at the output of summing network 21 relative to the phase on lead 14 can be thought of as a constant rate phase rotation in the counterclockwise direction, i.e., a phase rotation at the same rate as the phase rotation in the vicinity of the end of the first time slot, but in the opposite direction.

In response to the fourth transition, which occurs in the vicinity of the end of the fifth time slot, the negative sinusoidal waveform of the Q channel signal on lead 19 is combined with the positive going cosinusoidal wave of the I channel signal on lead 16 in the suppressed carrier modulator so that the phase of the output of summing network 21 is rotated at the same constant rate from a 180° phase lag condition to an in-phase condition relative to the RF wave on lead 14. The directions of the phase transitions at the output of summing network 21 relative to the phase of the signal on lead 14 always repeat in the stated directions to the stated values in response to each sequence of four successive binary bit transitions at the output of data source 11. By rotating the phase of the output of summing network 21 relative to the RF carrier on lead 14 in opposite directions equally during each sequence of four transitions in the output of binary data source 11, no cumulative phase change can occur, i.e., the frequency of the suppressed carrier derived from summing network 21 remains constant at the frequency of source 13. Phase error accumulation can also be avoided if there are only a pair of opposite phase transitions at the output of summing network 21 for two transitions in the output of data source 11. However, by providing four transitions in the output of summing network 21 for four sequential transitions in the output of data source 11, as described, conventional binary phase shift key detecting equipment can be employed, because such detecting equipment is automatically reset to zero, over a long time interval, by the tendency of the Q and I channel signals to have zero average value.

An algorithm for the operation of steering logic network 12 can be considered as follows:

(1) if a current bit is identical to a previous bit, the phase of the output of summing network 21 does not change for the current bit relative to the previous bit;

(2) if the current bit differs from the previous bit, the phase at the output of summing network 21 rotates at a constant rate from the current state to the next state, along a unit circle. The rotation rate is determined by $$\phi(t) = \pi/pT \text{ radians/second,}$$

where
    p = the percent of each bit derived from data source 11 required for a transition in the output of summing network 21, and
    T = the duration of each bit derived from data source 11;

(3) for any sequence of four successive transitions of data source 11, the phase at the output of network 21 rotates in response to the first transition 180° in the counterclockwise direction about the unit circle, in response to the second transition the phase at the output of summing network 21 rotates 180° in the clockwise direction about the unit circle, in response to the third transition the phase at the output of summing network 21 rotates in the clockwise direction about the unit circle 180°, and in response to the fourth transition the phase at the output of summing network 21 rotates in the counterclockwise direction 180° about the unit circle.

Circuitry for implementing the wave shapes of FIGS. 2B and 2C, to enable derivation of the phase relationship of FIG. 2A and which is included in shaping logic network 12, is illustrated in FIG. 3. The circuitry of FIG. 3 thus derives the sinusoidal humps of the Q channel signal on lead 19, as illustrated in FIG. 2B, as well as the cosinusoidal variations of the I channel signal, as derived on lead 16. Between these sinusoidal and cosinusoidal variations, the network of FIG. 3 maintains the signals on leads 16 and 19 at constant values.

To these ends, shaping logic network 12 includes edge detector and pulse shaper 41, having an input responsive to the output of binary data source 11. In response to each transition in the output of binary data source 11, edge detector and pulse shaper 41 derives a positive pulse having a leading edge coincident with the transition in the output of data source 11 and a trailing edge that occurs after approximately 16 clock pulses have been supplied by source 23 to lead 24. The length of the pulse derived by detector and shaper 41 is determined by the value of p, i.e., the percent of time that the phase of the output of summing network 21 is gradually changed. The output of detector and shaper 41 is applied to one input of AND gate 42, having a second input responsive to the relatively high frequency clock pulses on lead 24. AND gate 42 responds to the input signals thereof to derive 16 pulses which are a replica of the 16 pulses which are passed through the AND gate while detector and shaper 41 derives a positive, binary one level. The 16 output pulses of AND gate 42 are supplied to a clock input of up/down counter 43, having a capacity equal to one-half of the number of pulses coupled through AND gate 42 each time that detector and shaper 41 derives a binary one level. Thus, in this exemplary situation, counter 43 is an eight stage counter, having eight parallel output bits supplied to eight bit output bus 44. Thus, while gate 42 is enabled in response to the output of detector and pulse shaper 41, the signals on output bus 44 are undergoing transitions, but the signal on bus 44 remains static while the 48 pulses on lead 24 are being derived while detector and pulse shaper 41 is deriving a binary zero output.

The eight bit parallel signal on bus 44 is applied in parallel to address inputs of read only memories 45 and 46. Read only memories 45 and 46 are programmed to respond to the eight bit signal on bus 44 to enable the I and Q channel signals illustrated in FIGS. 2C and 2B to be respectively derived. Memory 45 is programmed to respond to the signal on bus 44 to derive a multi-bit binary signal representing all of the variations of the I channel signal, as illustrated in FIG. 2C. However, read only memory 46 is programmed so that it is capable of deriving a binary signal representing only the positive going sinusoidal humps of the Q channel signal, as illustrated in FIG. 2B. The negative going humps of the Q channel signal are derived by utilizing an appropriate logic circuit, described infra. In any event, read only memories 45 and 46 derive multi-bit binary output signals having values representing the transitions of the I and Q channel signals. The multi-bit output signals of read only memories 45 and 46 are respectively applied to digital to analog converters 47 and 48. The analog output signal of converter 47, which represents the I channel signal, is illustrated in FIG. 2C. The output signal of converter 48 is similar to the waveform of FIG. 2B; however, the negative going sinusoidal humps of FIG. 2B are derived by converter 48 as positive humps which are converted into negative humps by appropriate logic circuitry, described infra.

It is necessary to reinitialize counter 43 to a zero state after each transition in the output of data source 11. Also, it is necessary to respond to each transition in the output of data source 11 by producing a change in the I and Q channel signals immediately before and immediately after each time slot has been completed. To these ends, the up/down state of counter 43 is reversed after one half of the pulses have been coupled through AND gate 42 each time that the AND gate is enabled by the output of detector and shaper 41. The signal on bus 44 is coupled to limit detector 51 which derives a pulse in response to the maximum count of eight and the minimum count of zero in counter 43 being reached. The output pulse of limit detector 51 is applied to toggle or J-K flip-flop 52, having an output which is coupled to up/down control input 53 of counter 43. The output of J-K flip-flop 52 is also applied to a toggle input of J-K flip-flop 54, having a square wave output which is one-half of the frequency of the square wave output of flip-flop 52.

The output of flip-flop 54 controls electronic switch 55, selectively coupled between the output of digital to analog converter 48 and the inputs of inverting and non-inverting unity gain amplifiers 56 and 57. Flip-flop 54 is responsive to the outputs of counter 43, limit detector 51 and flip-flop 52 so that flip-flop 54 causes switch 55 to couple the output of digital to analog converter 48 directly to an input of non-inverting amplifier 57 while the positive humps in the Q channel signal are being derived. Flip-flop 54, however, is in the opposite state while the negative going humps of the Q channel signal are being derived, to couple the output of converter 48 to inverting unity gain amplifier 56. The output of amplifier 56 at this time is coupled through non-inverting amplifier 57, whereby the output of amplifier 57 is a replica of the Q channel signal illustrated in FIG. 2B. The output signals of converter 47 and non-inverting amplifier 57 are thereby the I and Q channel signals respectively supplied by shaping logic network 12 to mixers and filters 15 and 18 by way of leads 16 and 19.

The invention is included in a transmission link as illustrated in FIG. 4. The link comprises ground station 61 containing the transmitter of FIG. 1, space craft relay station 62 with a hard limiter, and ground station 63 containing the receiver circuit of FIG. 3. The signal transmitted from station 61 is relayed to station 63 via relay station 62.

While there has been described and illustrated one specific embodiment of the invention, it will be clear that variations in the details of the embodiment specifically illustrated and described may be made without departing from the true spirit and scope of the invention as defined in the appended claims.

I claim:

1. A method of transmitting binary coded data between an earth-bound station and a satellite station by a signalling process having a power spectral density that is well contained in a predetermined bandwidth to minimize interference with adjacent channels comprising phase modulating a carrier with the binary coded data to produce a suppressed carrier constant amplitude wave, the carrier being phase modulated by shaping modulation for the carrier so the carrier phase changes gradually relative to the phase of a reference wave at the carrier frequency, the phase change being between predetermined values in response to each transition in the values of the binary coded data and the carrier phase changing by equal and opposite amounts relative to the phase of the reference wave in response to a predetermined number of plural transitions in the values of sequential bits of the binary coded data, and launching the phase modulated carrier from one of the stations toward the other station.

2. The method of claim 1 wherein the modulation is shaped so the carrier phase change has an average value of zero over four successive transitions of the binary bit values.

3. The method of claim 1 wherein the modulation is shaped to cause:
   (a) the phase change of the carrier to be zero relative to the phase of the reference wave except when there is a transition between adjacent bits, and
   (b) the phase of the carrier to change at a constant rate relative to the phase of the reference wave in response to adjacent bits having different values.

4. The method of claim 3 wherein in response to first, second, third and fourth successive transitions of binary data bits the modulation is shaped to cause the carrier phase to be changed two times in the clockwise direction and two times in the counterclockwise direction relative to the phase of the reference wave, each of the phase changes being by the same predetermined amount, whereby in response to each of the first and fourth transitions the carrier phase is changed relative to the phase of the reference wave in one of the directions and in response to the second and third transitions the carrier phase is changed relative to the phase of the reference wave in the other of said directions.

5. The method of claim 3 wherein the phase rotation occurs for between about 10% to about 50% of a bit length.

6. The method of claim 1 further including the step of receiving the launched phase modulated carrier at the other station and detecting the coded data with binary phase shift key receiver equipment responsive to the received carrier.

7. The method of claim 1 wherein the satellite includes a relay station having a hard limiter for the phase modulated carrier, the relay station transmitting the phase modulated hard limited carrier to another station, modulation of the phase modulated carrier being such that the phase modulated hard limited carrier transmitted by the relay station to the another station is well contained in the predetermined bandwidth so interference with adjacent channels is minimized.

8. A method of transmitting binary coded data bits between an earth-bound station and a satellite station by a signalling process having a power spectral density that is well contained in a predetermined bandwidth to minimize interference with adjacent channels comprising the steps of deriving orthogonally phased first and second components of a carrier, responding to the data to derive I and Q channel signals, mixing the first component and the I channel signal to derive a first side band signal, mixing the second component and the Q channel signal to derive a second side band signal, linearly combining the first and second side band signals to derive a suppressed carrier constant amplitude wave, shaping the I and Q channel signals so the phase of the suppressed carrier constant amplitude wave changes gradually relative to the phase of a reference wave at the carrier frequency between predetermined values in response to each transition in the values of the binary coded data and the carrier phase changes by equal and opposite amounts relative to the phase of the reference wave in response to plural transitions in the values of sequential bits of the binary coded data whereby a phase modulated carrier is derived, and launching the phase modulated carrier from one of the stations toward the other station.

9. The method of claim 8 wherein the I and Q channel signals are shaped so the carrier phase change has an average value of zero over four adjacent transitions of the binary bit values.

10. The method of claim 8 wherein the I and Q channel signals are shaped so:
   (a) the phase change of the carrier is zero relative to the phase of the reference wave except when there is a transition between adjacent bits, and
   (b) the phase of the carrier changes at a constant rate relative to the phase of the reference wave in response to adjacent bits having different values.

11. The method of claim 8 wherein: the Q channel signal is a first wave having a zero value except when adjacent binary bits have differing values, in response to adjacent bits having differing values causing the first wave to vary with the shape of a single hump having initial and final zero values and an intermediate peak value; and the I channel signal is a second wave having a non-zero predetermined value having positive polarity or the predetermined value with a negative polarity except when adjacent binary bits have differing values, and in response to adjacent bits having differing values causing the second wave to vary between the predetermined positive and negative values, the first and second waves simultaneously having said variations in response to each transition of adjacent ones of said bits.

12. The method of claim 11 wherein a sequence of four successive transitions of the binary data bits causes the first wave to have two humps of a first polarity and two humps of a second polarity, and the second wave to have two changes from the positive to the negative predetermined value and two changes from the negative to the positive predetermined value.

13. The method of claim 11 wherein the humps begin and end substantially simultaneously with the beginning and end of the variations of the second wave.

14. The method of claim 13 wherein the humps of the first wave are shaped approximately as sine waves varying from 0° to 180° and the variations of the second wave are shaped approximately as cosine waves varying from 0° to 180°.

15. The method of claim 12 wherein the two positive humps occur in response to successive first pairs of transitions of the binary data bits and the two negative humps occur in response to successive second pairs of transitions of the binary data bits, the second transition of the first pair being immediately adjacent the first transition of the second pair.

16. The method of claim claim 9 wherein the phase rotation occurs for between about 10% to about 50% of a bit length.

17. The method of claim 12 wherein the first and second polarities are respectively positive and negative, each of the positive humps occurring while the second wave is occurring.

18. The method of claim 8 further including the step of receiving the launched phase modulated carrier at the other station and detecting the coded data bits with binary phase shift key receiver equipment responsive to the received carrier.

19. The method of claim 8 wherein the satellite includes a relay station having a hard limiter for the phase modulated carrier, the relay station transmitting the phase modulated hard limited carrier to another station, modulation of the phase modulated carrier being such that the phase modulated hard limited carrier transmitted by the relay station to the another station is well contained in the predetermined bandwidth so interference with adjacent channels is minimized.

20. The method of claim 19 wherein the satellite includes a relay station having a hard limiter for the phase modulated carrier, the relay station transmitting the phase modulated hard limited carrier to another station, modulation of the phase modulated carrier being such that the phase modulated hard limited carrier transmitted by the relay station to the another station is well contained in the predetermined bandwidth so interference with adjacent channels is minimized.

21. A method of transmitting binary coded data bits between an earth-bound station and a satellite station by a signalling process having a power spectral density that is well contained in a predetermined bandwidth to minimize interference with adjacent channels comprising the step of phase modulating a carrier to produce a suppressed carrier constant amplitude wave having carrier phase changes that vary gradually between predetermined values relative to the phase of a reference wave at the carrier frequency in response to each transition in the values of the binary coded data and the carrier phase changes by equal and opposite amounts relative to the phase of the reference wave in response to plural transitions in the values of sequential bits of the binary coded data, and launching the phase modulated carrier from one of the stations toward the other station.

22. The method of claim 21 wherein the carrier phase does not change relative to the phase of the reference wave except in response to the transitions, and the phase of the carrier rotates at a constant rate relative to the phase of the reference wave in response to each of the transitions.

23. The method of claim 22 wherein in response to first, second, third and fourth successive transitions of binary data bits the carrier phase is changed two times in the clockwise direction and two times in the counterclockwise direction relative to the phase of the reference wave, whereby in response to each of the first and fourth transitions the carrier phase is changed by a predetermined amount relative to the phase of the reference wave in one of the directions and in response to each of the second and third transitions the phase is changed in the other of said directions.

24. The method of claim 22 wherein in response to first and second successive transitions of binary data bits the carrier phase is changed by a predetermined amount in the clockwise direction and in the counterclockwise direction relative to the phase of the reference wave, whereby in response to the first transition the carrier phase is changed relative to the phase of the reference wave in one of the directions and in response to the second transition the phase is changed in the other of said directions.

25. The method of claim 21 further including the step of receiving the launched phase modulated carrier at the other station and detecting the coded data bits with binary phase shift key receiver equipment responsive to the received carrier.

26. A method of transmitting a sequence of binary coded data bits including at least four binary transitions between an earth-bound station an a satellite station by a signalling process having a power spectral density that is well contained in a predetermined bandwidth to minimize interference with adjacent channels comprising the steps of:

deriving I and Q channel orthogonal carriers having equal, constant AC amplitudes, responding to each transition of the sequence to derive I and Q channel modulating waves, the I channel modulating wave having equal and opposite constant amplitudes except in response to each of the transitions, the I channel modulating wave having cosine-like variations between the equal and opposite constant amplitudes in response to each transition, the slope directions of successive ones of the cosine-like variations being opposite, the Q channel modulating wave having a zero amplitude base and equal amplitude sinusoidal-like variations in response to each transition, a first adjacent pair of the sinusoidal-like variations having a first polarity, a second adjacent pair of the sinusoidal-like variations having a second polarity opposite the first polarity, the second pair of sinusoidal-like variations following immediately after the first pair of sinusoidal-like variations, each of the transitions causing the simultaneous occurrence of one sine and one cosine-like variation, mixing the I channel carrier with the I channel modulating wave to derive an I channel modulated wave, mixing the Q channel carrier with the Q channel modulating wave to derive a Q channel modulated wave, linearly combining the I and Q channel modulated waves to derive a constant amplitude suppressed carrier output wave having gradual carrier phase changes between adjacent transitions of the binary bits without cumulative phase errors relative to a reference phase of the carrier over four adjacent transitions of the binary bits, and launching the phase modulated carrier from one of the stations toward the other station.

27. The method of claim 26 further including the step of receiving the launched phase modulated carrier at the other station and detecting the coded data bits with binary phase shift key receiver equipment responsive to the received carrier.

28. The method of claim 26 wherein the satellite includes a relay station having a hard limiter for the phase modulated carrier, the relay station transmitting the phase modulated hard limited carrier to another station, modulation of the phase modulated carrier being such that the phase modulated hard limited carrier transmitted by the relay station to the another station is well contained in the predetermined bandwidth so interference with adjacent channels is minimized.

29. A method of transmitting binary coded data between a first station and a second station via a relay station having a hard limiter by a signalling process having a power spectral density that is well contained in a predetermined bandwidth to minimize interference with adjacent channels comprising phase modulating a carrier with the binary coded data to produce a suppressed carrier constant amplitude wave, the carrier being phase modulated by shaping modulation for the carrier so the carrier phase changes gradually relative to the phase of a reference wave at the carrier frequency, the phase change being between predetermined values in response to each transition in the values of the binary coded data and the carrier phase changing by equal and opposite amounts relative to the phase of the reference wave in response to a predetermined number of plural transitions in the values of sequential bits of the binary coded data, and launching the phase modulated carrier from the first station to the second station via the relay station, the hard limiter of the relay station removing AM on the phase modulated carrier, the relay station transmitting the phase modulated hard limited carrier to the second station.

30. A method of transmitting binary coded data bits between a first station and a second station via a relay station having a hard limiter by a signalling process having a power spectral density that is well contained in a predetermined bandwidth to minimize interference with adjacent channels comprising the steps of deriving orthogonally phased first and second components of a carrier, responding to the data to derive I and Q channel signals, mixing the first component and the I channel signal to derive a first side band signal, mixing the second component and the Q channel signal to derive a second side band signal, linearly combining the first and second side band signals to derive a suppressed carrier constant amplitude wave, shaping the I and Q channel signals so the phase of the suppressed carrier constant amplitude wave changes gradually relative to the phase of a reference wave at the carrier frequency between predetermined values in response to each transition in the values of the binary coded data and the carrier phase changes by equal and opposite amounts relative to the phase of the reference wave in response to plural transitions in the values of sequential bits of the binary coded data to derive a phase modulated carrier, launching the phase modulated carrier from the first station to the second station via the relay station, the hard limiter of the relay station removing AM on the phase modulated carrier, the relay station transmitting the phase modulated hard limited carrier to the second station.

31. A method of transmitting binary coded data bits between a first station and a second station via a relay station having a hard limiter by a signalling process having a power spectral density that is well contained in a predetermined bandwidth to minimize interference with adjacent channels comprising the step of phase modulating a carrier to produce a suppressed carrier constant amplitude wave having carrier phase changes that vary gradually between predetermined values relative to the phase of a reference wave at the carrier frequency in response to each transition in the values of the binary coded data and the carrier phase changes by equal and opposite amounts relative to the phase of the reference wave in response to plural transitions in the values of sequential bits of the binary coded data, and launching the phase modulated carrier from the first station to the second station via the relay station, the hard limiter of the relay station removing AM on the phase modulated carrier, the relay station transmitting the phase modulated hard limited carrier to the second station.

32. A method of transmitting a sequence of binary coded data bits including at least four binary transitions between a first station and a second station via a relay station having a hard limiter by a signalling process having a power spectral density that is well contained in a predetermined bandwidth to minimize interference with adjacent channels comprising the steps of:

deriving I and Q channel orthogonal carriers having equal, constant AC amplitudes, responding to each transition of the sequence to derive I and Q channel modulating waves, the I channel modulating wave having equal and opposite constant amplitudes except in response to each of the transitions, the I channel modulating wave having cosine-like variations between the equal and opposite constant amplitudes in response to each transition, the slope directions of successive ones of the cosine-like variations being opposite, the Q channel modulating wave having a zero amplitude base and equal amplitude sinusoidal-like variations in response to each transition, a first adjacent pair of the sinusoidal-like variations having a first polarity, a second adjacent pair of the sinusoidal-like variations having a second polarity opposite the first polarity, the second pair of sinusoidal-like variations following immediately after the first pair of sinusoidal-like variations, each of the transitions causing the simultaneous occurrence of one sine and one cosine-like variation, mixing the I channel carrier with the I channel modulating wave to derive an I channel modulated wave, mixing the Q channel carrier with the Q channel modulating wave to derive a Q channel modulated wave, linearly combining the I and Q channel modulated waves to derive a constant amplitude phase modulated suppressed carrier output wave having gradual carrier phase changes between adjacent transitions of the binary bits without cumulative phase errors relative to a reference phase of the carrier over four adjacent transitions of the binary bits, and launching the phase modulated carrier from the first station to the second station via the relay station, the hard limiter of the relay station removing AM on the phase modulated carrier, the relay station transmitting the phase modulated hard limited carrier to the second station.

* * * * *